March 25, 1969     W. S. BOYLE ET AL     3,434,661
SNOW MAKING
Filed Feb. 1, 1966

INVENTORS
Willard Sterling BOYLE
David Cyril CREAGHAN

ATTORNEY

United States Patent Office 3,434,661
Patented Mar. 25, 1969

3,434,661
SNOW MAKING
Willard Sterling Boyle, 1 Magnolia Place, Summit, N.J.,
07901, and David Cyril Creaghan, 237 Hampshire
Road, Beaconsfield, Quebec, Canada
Filed Feb. 1, 1966, Ser. No. 524,313
Claims priority, application Great Britain, Feb. 2, 1965,
4,406/65
Int. Cl. A01g *15/00;* B05b *7/30*
U.S. Cl. 239—2
10 Claims

ABSTRACT OF THE DISCLOSURE

A method for making snow which comprises dispersing solid seeding particles in water and then spraying the water into the atmosphere at temperatures below freezing.

---

This invention relates to snow making.

Snow making has become an important operation in the maintenance of snow-covered surfaces for winter sports. Generally speaking, the snow is made by projecting water into the air at an ambient temperature at or below freezing in an amount and at such a rate that substantially all the water is at least partly crystallized prior to depositing on the ground. The water is projected in finely divided form, usually as a "fog." One specific method and apparatus for generating snow is shown, for example, in United States Patent 2,968,164, Jan. 17, 1961, A. W. Hanson.

It is a well-known scientific principle that liquids will cool well below their normal melting temperature if they are pure in the sense that there are no centres present for the nucleation of a crystallite. In particular, if even relatively impure water is divided into small droplets, some of the droplets may be cooled at least to 0° F. before freezing takes place. This occurs because statistically there is a relatively small probability of finding a nucleation centre in any given droplet. It is readily seen, therefore, that in the type of snow-making machine referred to above that except at very low temperatures a large fraction of the water droplets will solidify only after making contact with the ground. This is undesirable for at least two reasons:

(1) The surface tends to be covered with a cohesive layer of ice rather than free-moving ice crystals.

(2) The latent heat of fusion is given up to the ground rather than exchanged with the atmosphere during freefall. This tends to raise the temperature of the surface of the ground leading to the formation of slush rather than dry snow.

To assist the atomization of the water and also to refrigerate the droplets further, compressed air may be blown through the nozzle. This process, however, leads to high capital cost of equipment, and it is very difficult to prevent the nozzle from freezing up and blocking. It is normally found that standard snow-making equipment will only function satisfactorily under very cold and very dry weather conditions, when an additional cooling effect is obtained due to evaporation.

The applicants have now found that the process of making snow in the manner described can be improved by dispersing in the spray or "fog" formed by the projection of the water a finely divided material, that is solid at temperatures above the melting point of water. The introduction of the finely divided solid material enhances crystals growth and consequently the amount of snow produced and also improves the quality of the snow-forming crystals. One satisfactory finely divided solid material is Portland cement. Other materials such as special clays that naturally have a small grain size or certain chemicals such as silver iodide and copper sulfide which can readily be produced as fine smokes or powders could also be used.

In order for the method of the invention to function efficiently, it has been found insufficient to merely introduce a supply of the seeding material at the exit of the nozzle. In accordance with the practice of the invention, the seeding material is thoroughly dispersed within the water which is proceeding to the nozzle, so that when the water finally emerges in the form of droplets, the majority of the droplets each contain within them at least one seed particle.

According to one aspect of the invention, there is provided in a method of forming, distributing and depositing snow comprising the steps of spraying atomized water into the atmosphere at ambient temperatures below about 30° F. and allowing the droplets to freeze and deposit as snow, the improvement comprising inhibiting the super-cooling of the droplets by the inclusion in the water before atomization of dispersed solid seeding particles so as to cause each of the majority of the atomized water droplets to contain at least one such particle acting nucleus for crystallization.

According to a second feature of the invention, there is provided apparatus for forming, distributing and depositing snow comprising an atomizer nozzle, first conduit means connected to the nozzle, means for causing water under pressure to flow through the nozzle there to be atomized, distributed in droplets and allowed to deposit, and means for distributing in the water in the said first conduit solid seeding particles.

The relative amounts of water, air and solid material can be adjusted to meet the circumstances and the relative amounts for best results can be determined experimentally in conjunction with the atmospheric conditions of temperature, humidity, wind, etc.

Having thus generally described the invention, it will be more particularly described and illustrated by reference to the accompanying drawings, in which.

It can be shown that the rate at which a droplet of water will cool, assuming a saturated atmosphere with no ventilation effects and a particle size of less than 50 microns can be expressed as:

$$\frac{dT}{dt} = \frac{3kT}{r^2}$$

where $r$ is the radius of the droplet, T is absolute temperature, and $t$ is time.

It is also known that the terminal velocity of a droplet of water assuming a size less than 50 microns may be given by the expression:

$$u = 1.19 \times 10^6 \, r^2 \text{ cm./sec.}$$

From these two expressions it is evident that the distance a droplet has to fall at a given temperature in order to freeze will vary as the fourth power of the radius of the droplet.

This means that to obtain good freezing at relatively high sub-freezing tempertaures, the droplets must be maintained very small.

This discussion takes no accord of the effect of supercooling, which will further extend the time taken for a droplet of water to freeze.

Figure 1:
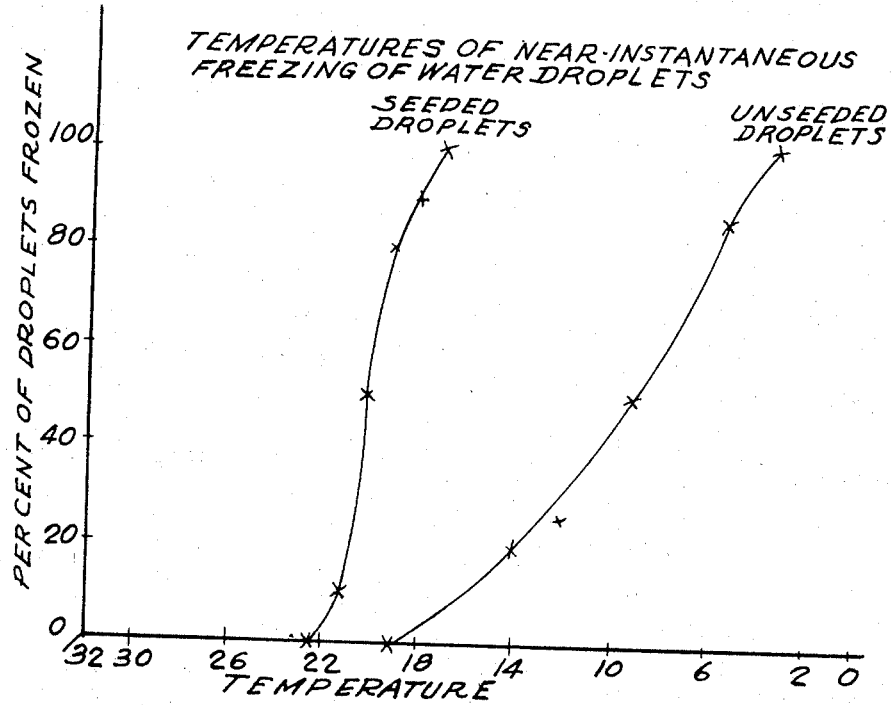
FIGURE 1 is a graph comparing the wet bulb temperatures and the percent of particles which freeze in a given, near instantaneous time when seeded and unseeded.

FIGURE 1 compares the temperatures (under saturated humidity conditions) at which droplets of water were found to freeze in a given time which was near instantaneous when seeded and not seeded. The seeded water which was prepared in accordance with the invention contained dispersed silver iodide in a concentration of about 1 lb. to 200,000 gallons of water. This concentration was calculated on the basis that the preferred diameter of the water droplets would be about 200 microns and that each such droplet should contain a particle silver iodide of approximately 0.4 micron diameter. In FIGURE 1 the temperature is shown on a logarithmic scale in degrees Fahrenheit increasing from 0 to 32 degrees in a left hand direction. Taking for example a water droplet, it will be seen that 100% of the unseeded droplets were found to freeze at 4° F. whereas 100% of the seeded droplets froze at about 20° F.

The values found experimentally and set forth in FIGURE 1 were determined by observing the freezing of drops suspended in oil.

The silver iodide was prepared in suspension by preparing a concentrated solution of silver iodide (1 part by weight) in concentrated potassium iodide solution (3 parts) and injecting this with stirring into water to the required concentration, causing the insoluble silver iodide to be precipitated in the large volume of water.

It is apparent that by judicious use of the present invention, much larger volumes of snow will be obtainable in a given period, and in addition, the snow will be of a more satisfactory texture. Furthermore, the successful use of the equipment is no longer governed to the same extent upon cold, dry weather conditions. It is notable that the results shown in FIGURE 1 were obtained under high humidity conditions. The apparent temperature of the droplets can be increased by ventilating the sprayed droplets by means of a fan, if the wind conditions are poor, due to the cooling effect of evaporation at the surfaces of the droplets.

Alternatively, or in addition, the water line can be mixed with compressed air from an air line to assist the atomization of the water, and at the same time, to increase the rate of cooling. Such expedients are known in the art.

FIGURE 2 illustrates schematically the type of apparatus which can be used on a portable snow-making machine to carry out the invention. It will be apparent to those skilled in the art how to adapt the tank shape and volume and the arrangement of pipes to suit a particular vehicle to be used. There is shown at 1 a mixing tank fitted with an electric motor 2 driving a mixer or propeller 3. The tank may be filled up to a certain level from a water line 4 by means of a valve 5 and thereafter a preset amount of solid or liquid seeding material may be admitted from an automatic dispenser 6 of the type which will open to admit a preset volume or weight of material. Many such devices are known. A second line 12 with valve 13 is provided for the admission of a wetting agent. The admission of a wetting agent has been found to greatly assist the dispersion of fine particular clays, cement and other similarly finely divided solids, and also assists the atomization process by reducing surface tension. The wetting agents used may be commonly employed as detergents, such as that sold under the trade name "Teepol."

The dispersion in the mixing tank is continually agitated by means of the mixer drive 2. After a period of time to allow thorough mixing, the valves 7 and 8 are opened and adjusted to allow the passage of dispersion through the line 9 at a desired rate as measured by the meter. A pump may be fitted to the line 9 if insufficient head is obtainable. The line 9 communicates through valve 8 into the main water line 10 which communicates at the left hand end with the nozzle and at the right hand end optionally to a water pump P and to a surge tank.

The nozzle may be of known adjustable type, many of which are suitable for producing droplets of the desired size, e.g. those used in garden hoses, irrigation systems, building sprays and those described in the aforementioned United States patent. In practice, the nozzle is merely adjusted until the ejected water droplets produce the optimum rate of snow formation obtainable at the ambient temperature.

The nozzle may be of the type fitted with an air line 11 also communicating with a surge tank, to assist the atomization and rate of cooling of the droplets. Such devices are also known.

The preferred size of the seeding particles which are introduced into the mixing tank or water line is within a range of diameters of about 0.01 micron to 1 micron. This particle size is conveniently obtained in certain types of naturally occurring clay minerals, and of these, kaolin is most useful in that it is nonswelling and relatively easily dispersed. Portland cement can also be used.

Various known devices may be used for mixing the concentrated dispersion of, for example, clay or cement before admission to the water line. One useful expedient is that conventionally adopted in the building trade for cement mixing, although in the present adaptation dilute solutions are employed. A sump pump, for example, an Allis-Chalmers Type SRL pump, can be used to withdraw dispersion from the bottom of a tank such as the tank 1 and return it to the top. After a certain period for mixing part of the output of the pump can be withdrawn through a three way valve for admission to the water line 10.

Alternatively, an "Intrusion Pre-pack" colloidal mixer may be used. This has a rotation cylinder adjacent an inside wall of the tank which forces the dispersion rapidly through the small space between the cylinder and the tank wall for thorough mixing. If such mixing apparatus is used, it is possible to dispense with the use of a wetting agent.

However, the most convenient and reliable particles for seeding are those of silver iodide, since particles of relatively constant size within the given size range can be conveniently prepared by precipitation.

The silver iodide can be admitted in the following ways:

(1) By injecting an aqueous solution of one part of silver iodide in three parts of concentrated potassium iodide solution as already described.

(2) By injecting an acetone solution of sodium iodide (1 part) and silver iodide (4 parts).

(3) By injecting at slightly spaced points into the water to be mixed a solution of a soluble silver salt, e.g. silver nitrate, and a solution of a soluble iodide, e.g. potassium iodide.

It will be apparent that the seeding material can be admitted into a given volume of water in a mixing tank which is afterwards used, or a dispersion of intermediate concentration can be injected into a water line carrying water at a predetermined rate to the nozzle, as indicated by the water pump P shown in dotted lines. If cement or clay is used, the concentration in the water line should be sufficient for the majority of water droplets to contain a single seeding particle. The concentration may be calculated following the example given in respect of silver iodide. If potassium iodide and silver nitrate are separately injected to cause precipitation of the silver iodide, the two materials can be injected at different points in the water line. The precipitation of the silver iodide from acetone or potassium iodide solutions of the latter is preferred in that a substantially constant particle size of 0.4 micron is obtained.

It will further be apparent that the apparatus shown in FIGURE 2 may be run continuously by maintaining a substantially constant head of dispersion in the mixing tank by admitting quantities of water and seeding material in batches at the top of the tank as the dispersion is withdrawn from the bottom of the tank.

On a smaller scale, a convenient apparatus may be formed by using a standard water hose having a constant pump delivery and adjustable nozzle and siphoning into the water line a dispersion of the seeding material which is relatively concentrated and which will be distributed within the water in the water line between the point of siphoning and the nozzle to bring the seeding material to the required concentration. Such siphoning devices are commonly employed in the admixture of weed killer, fertilizer, etc., to irrigation sprays and garden hoses. Examples of the end concentration of the sprayed water have been given and the concentration of the dispersion siphoned into the water line will depend upon the rate of ordinary water flow through the line. The concentration of the dispersion may, therefore, be readily calculated.

Figure 3:
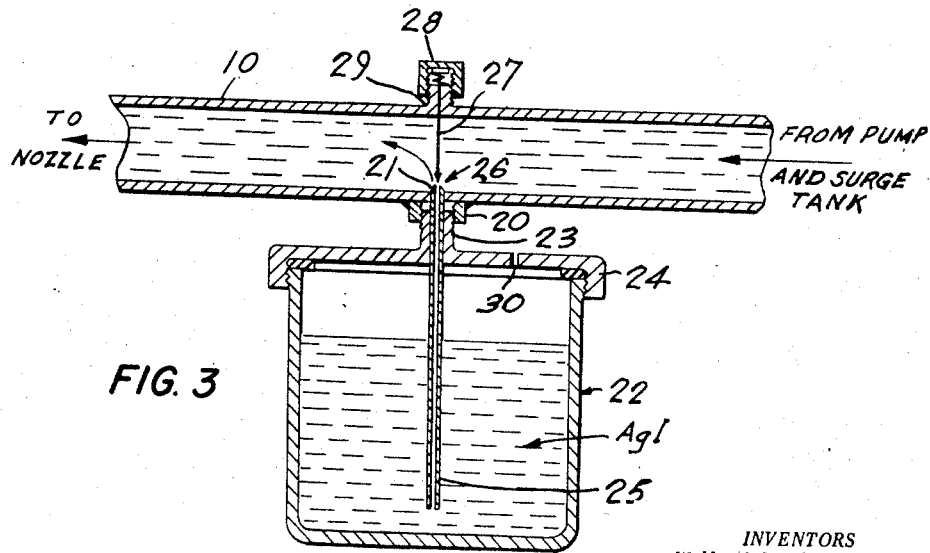
FIGURE 3 is a cross-sectional view of modified apparatus in accordance with the invention.
Figure 2:
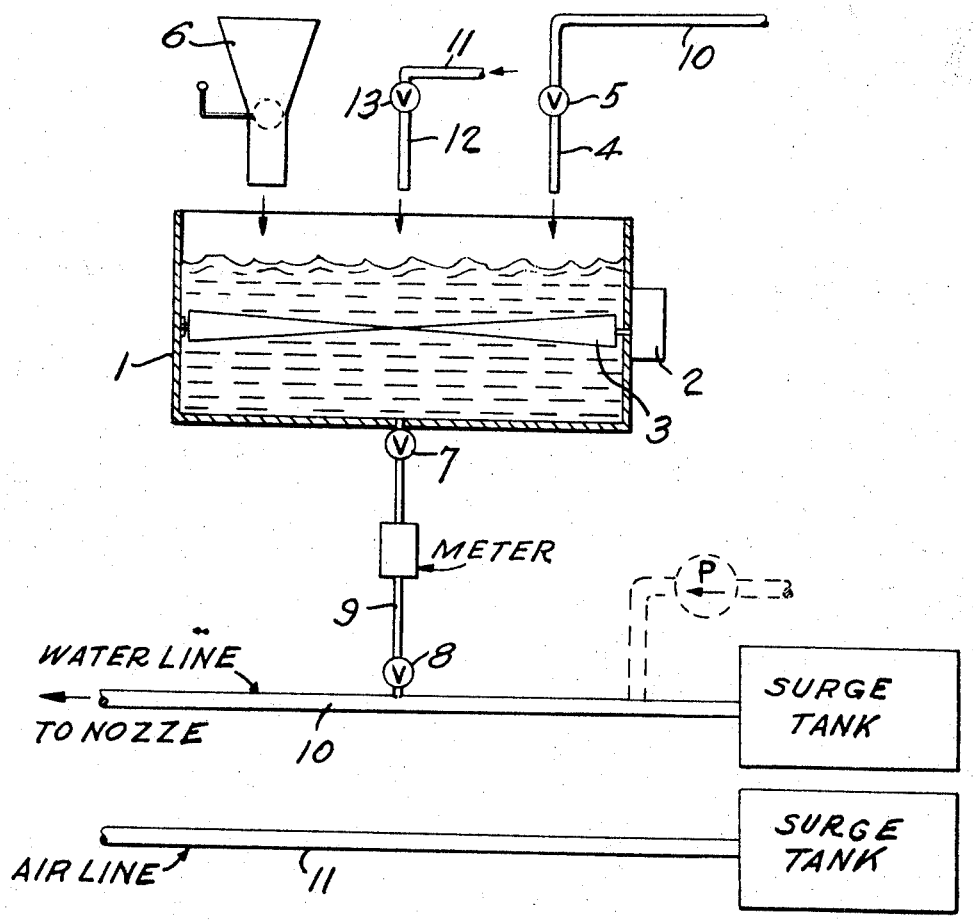
FIGURE 2 is a schematic layout of apparatus for use in accordance with the invention incorporating means for mixing seeding material into a water line.

FIGURE 3 shows a modified apparatus suitable for injecting a concentrated solution of silver iodide into the water line denoted by 10'. The water line 10' which at the left hand end in FIGURE 3 proceeds to the nozzle and at the right hand end communicates with the surge tank has a small aperture 21 intermediate its length and in its lowermost surface portion. Welded around the aperture 21 is a threaded sleeve 20 which is adapted to hold a container 22, by means of a threaded stub 23 rigid with the screw cap 24 of the container. Extending through the screw cap 24 and the stub 23 to a point near the bottom of the container is a small diameter tube or conduit means 25, which at its upper extremity extends into the aperture 21 and preferably terminates in a jet portion 26. The effect of the water travelling through the water line 10' is to siphon concentrated silver iodide solution contained in the container 22 up through the tube 25 to be dispersed within the water proceeding to the nozzle. A small aperture 30 is provided in the screw cap 25 for the admission of air.

The size of the jet portion 26 determines the rate and volume of silver iodide solution passing into the water. The size of the opening of the jet 26 is preferably controlled by a needle valve shaft 27 which may be adjusted by twisting the screw cap 28 threadedly fitted to a stub 29 which is opposite the stub 20 and is provided with an aperture which extends through the pipe 10' and through which the shaft 27 is adapted to slide. Thus the amount of silver iodide solution passing into the water proceeding to the nozzle may be adjusted.

In practice, the screw cap 28 will be adjusted in accordance with the adjustment of the nozzle to provide the best snow formation conditions under the prevailing ambient weather conditions.

Means may be necessary to provide a constant level of concentrated silver iodide solution within the container 22, as will be obvious to those skilled in the art. However, since only about 1 lb. of silver iodide is needed per 200,000 gallons of water, it is apparent that a relatively small container can be used in connection with very large quantities of water.

It is apparent that two such containers 22 can be used spaced apart at a slight distance, for example, of about a foot, and one containing a soluble silver salt and the other containing a soluble iodide so that the components are intermixed in the water line 21 to precipitate silver iodide in the solution proceeding to the nozzle. If desired, the containers may be suitably modified and arranged upside down for gravity feed.

It will be apparent that the water can be admixed with air at the nozzle in order to assist the atomization, and if necessary, to refrigerate the water by expanding the air at the nozzle. Apparatus for this procedure is set forth in U.S. Patent 2,676,471, which further illustrates types of nozzle which can be used. However, it has been found that the additional refrigeration which occurs when air is expanded at the nozzle leads to undesirable effects such as freezing up of the nozzle itself and also the admixture of air requires capital expenditure of air pumps, etc. One of the advantages of the present invention is that the use of air blowing can, if necessary, be dispensed with under most conditions encountered, and the additional capital expenditure on this equipment is not strictly necessary.

Where copper sulphide is used in place of silver iodide, the particles may be precipitated by injecting at spaced locations into the water pipe concentrated solutions resectively of a soluble copper salt, e.g. copper sulphate and a soluble sulphide, e.g. ammonium sulphide.

Many further modifications within the spirit and scope of the invention, as defined by the following claims, will be apparent to those skilled in the art.

We claim:
1. In a method of forming, distributing and depositing snow comprising the steps of spraying atomized water into the atmosphere at ambient temperatures below about 30° F. and allowing the droplets to freeze and deposit as snow, the improvement comprising inhibiting the supercooling of the droplets by the inclusion in the water before atomization of dispersed solid seeding particles so as to cause each of the majority of the atomized water droplets to contain at least one such particle acting as nucleus for crystallization.

2. The improvement of claim 1 wherein the dispersed solid particles have a major proportion of less than 1 micron in diameter.

3. The improvement of claim 1 wherein the dispersed solid particles have a major proportion of diameter within the range of 0.01 micron to 1 micron.

4. The improvement of claim 3 wherein the concentration of said particles in the sprayed water is calculated substantially on the basis that droplets of 200 microns are formed and each is to contain a single particle.

5. The improvement of claim 3 wherein the particles include material selected from the group consisting of clays and cement.

6. The improvement of claim 3 wherein the particles are selected from the group consisting of silver iodide and copper sulfide.

7. The improvement of claim 6 wherein silver iodide is precipitated in the water flowing to the atomizer by injection into the water of a concentrated solution of silver iodide in a solvent therefor so as to cause the silver iodide to be precipitated upon dilution.

8. The improvement of claim 6 wherein silver iodide is chemically formed and precipitated in the water fed to the atomizer by injection into the water at slightly spaced locations concentrated solutions respectively of a water soluble iodide and a water soluble silver salt.

9. The improvement of claim 6 wherein copper sulphide is chemically formed and precipitated in the water fed to the atomizer by injection into the water at slightly spaced locations concentrated solutions respectively of a water soluble sulphide and a water soluble copper salt.

10. The improvement of claim 5 wherein clay or cement particles are mechanically dispersed in a tank with water to an intermediate concentration, the latter being injected into flowing water proceeding to the atomizer.

References Cited

UNITED STATES PATENTS

| | | | |
|---|---|---|---|
| 2,527,230 | 10/1950 | Schaefer et al. | 239—2 |
| 2,934,275 | 4/1960 | Ball | 239—2 |
| 3,010,660 | 11/1961 | Barrett | 239—2 |
| 3,056,556 | 10/1962 | Sanger et al. | 239—2 |
| 3,272,434 | 9/1966 | Zettlemoyer et al. | 239—2 |

FOREIGN PATENTS

| | | |
|---|---|---|
| 1,372,024 | 8/1964 | France. |

(Other references on following page)

OTHER REFERENCES

Hosler: On the Crystallization of Supercooled Clouds, Journal of Meterorology, vol. 8, pp. 326–331, October 1951.

Mason: The Nucleation and Growth of Ice Crystals, Physics of Precipitation, Geophysical Monograph #5, Pub. Am. Geophysical Union, 1960, #746, June 3–5, 1959, pp. 226–230.

EVERETT W. KIRBY, *Primary Examiner.*

U.S. Cl. X.R.

239—14, 318